US012799775B2

(12) United States Patent
Banse

(10) Patent No.: US 12,799,775 B2
(45) Date of Patent: Nov. 17, 2026

(54) LOCK

(71) Applicant: ABUS August Bremicker Söhne KG, Wetter-Volmarstein (DE)

(72) Inventor: Manuel Banse, Herborn (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 2 days.

(21) Appl. No.: 18/985,400

(22) Filed: Dec. 18, 2024

(65) Prior Publication Data

US 2025/0230686 A1 Jul. 17, 2025

(30) Foreign Application Priority Data

Jan. 12, 2024 (DE) ......................... 102024100958.6

(51) Int. Cl.
*E05B 61/00* (2006.01)
*E05B 47/00* (2006.01)

(52) U.S. Cl.
CPC ...... *E05B 61/00* (2013.01); *E05B 2047/0067* (2013.01)

(58) Field of Classification Search
CPC ............. E05B 61/00; E05B 2047/0067; E05B 2047/0026; E05B 2047/0069; E05B 1/0038; E05B 47/0661; E05B 47/068; E05B 47/0012; E05B 55/06; E05B 55/12; E05B 3/00; E05B 17/2023; E05B 17/22; E05B 13/005; E05B 13/105; E05C 1/12; B62J 9/27; B62J 43/20; B62J 50/21; Y10T 292/0969; Y10T 292/0977; Y10T 292/0964; Y10T 292/0995; Y10T 292/1016; Y10T 292/1021; Y10T 292/1028; Y10T 292/57; Y10S 292/37
USPC ................................................................. 70/1
See application file for complete search history.

(56) References Cited

U.S. PATENT DOCUMENTS

| | | | | | |
|---|---|---|---|---|---|
| 1,965,939 | A | * | 7/1934 | Jacobi | E05B 83/30<br>70/DIG. 4 |
| 1,968,285 | A | * | 7/1934 | Egan | E05B 13/005<br>292/172 |
| 2,186,666 | A | * | 1/1940 | Cereda | E05C 1/14<br>292/170 |
| 2,313,711 | A | * | 3/1943 | Jacobi | E05B 83/30<br>70/145 |
| 2,383,574 | A | * | 8/1945 | Voight | E05C 1/14<br>292/170 |
| 2,765,648 | A | * | 10/1956 | Hatcher | E05B 47/0603<br>292/144 |
| 3,090,643 | A | * | 5/1963 | Barnes, Sr. | E05C 1/14<br>292/170 |

(Continued)

FOREIGN PATENT DOCUMENTS

| | | | | | |
|---|---|---|---|---|---|
| DE | 803698 | C | * | 4/1951 | |
| DE | 2351975 | A | * | 4/1974 | E05B 17/04 |

(Continued)

*Primary Examiner* — Steven A Tullia
(74) *Attorney, Agent, or Firm* — Dickinson Wright PLLC

(57) ABSTRACT

The invention relates to a lock comprising a locking mechanism that has a latch that can be moved between a locking position, which is provided for securing a counter-piece movable relative to the locking mechanism, and an unlocking position provided for releasing the counter-piece, and an actuation element for manually moving the latch into the unlocking position.

11 Claims, 3 Drawing Sheets

(56) References Cited

U.S. PATENT DOCUMENTS

| | | | | | |
|---|---|---|---|---|---|
| 3,385,622 | A * | 5/1968 | Winger | E05C 1/14 | 292/170 |
| 3,919,866 | A * | 11/1975 | Lipschutz | E05B 17/04 | 70/81 |
| 4,167,104 | A * | 9/1979 | Bond | E05B 5/003 | 70/282 |
| 4,226,451 | A * | 10/1980 | Gingras | E05B 13/005 | 292/169.21 |
| 4,384,465 | A * | 5/1983 | Muus | E05B 13/005 | 292/172 |
| 5,588,318 | A * | 12/1996 | Osborne | E05B 47/0002 | 292/144 |
| 5,689,980 | A * | 11/1997 | Weinerman | E05C 1/14 | 292/DIG. 31 |
| 5,943,888 | A * | 8/1999 | Lawson | E05B 63/248 | 292/341.15 |
| 6,113,160 | A * | 9/2000 | Johansson | E05C 5/00 | 292/DIG. 37 |
| 6,318,138 | B1 * | 11/2001 | Mathews | E05B 47/0012 | 70/279.1 |
| 6,343,816 | B1 * | 2/2002 | King | E05B 63/22 | 292/DIG. 37 |
| 6,575,503 | B1 * | 6/2003 | Johansson | E05B 5/003 | 292/336.3 |
| 6,967,562 | B2 * | 11/2005 | Menard | E05B 47/00 | 70/222 |
| 7,152,441 | B2 * | 12/2006 | Friar | E05B 65/46 | 70/284 |
| 7,553,237 | B2 * | 6/2009 | Rodriguez | G07F 17/3216 | 70/264 |
| 7,647,797 | B1 * | 1/2010 | Viso Cabrera | E05B 1/0038 | 292/144 |
| 8,534,718 | B2 * | 9/2013 | Loret de Mola | E05C 1/12 | 292/191 |
| 8,757,675 | B2 * | 6/2014 | Loret de Mola | E05C 9/046 | 292/170 |
| 8,770,633 | B2 * | 7/2014 | Stango | E05B 13/101 | 292/61 |
| 8,789,858 | B2 * | 7/2014 | Loret de Mola | E05C 1/085 | 292/164 |
| 9,145,719 | B2 * | 9/2015 | Hartford | E05B 1/0038 | |
| 10,519,692 | B1 * | 12/2019 | Baird | E05B 15/10 | |
| 10,683,677 | B1 * | 6/2020 | Funamura | E05B 17/0075 | |
| 11,149,472 | B1 * | 10/2021 | Tzarnotzky | B64C 1/1407 | |
| 2003/0209043 | A1 * | 11/2003 | Yeh | E05B 47/0012 | 70/280 |
| 2014/0167424 | A1 * | 6/2014 | Frias | E05C 19/163 | 292/145 |
| 2021/0230905 | A1 * | 7/2021 | Loon | E05C 3/042 | |
| 2022/0290467 | A1 * | 9/2022 | Banse | E05B 47/0603 | |

FOREIGN PATENT DOCUMENTS

| | | | | | |
|---|---|---|---|---|---|
| DE | 7515928 | U | | 1/1976 | |
| DE | 102020113121 | A1 | * | 11/2020 | H01M 50/262 |
| DE | 102021105647 | A1 | | 9/2021 | |
| DE | 102021122786 | A1 | | 3/2023 | |
| EP | 2053185 | A2 | | 4/2009 | |
| ES | 2338036 | T3 | * | 5/2010 | B62H 5/001 |
| ES | 2628040 | A1 | * | 8/2017 | E05B 47/0012 |
| FR | 2918695 | A1 | * | 1/2009 | E05B 53/003 |
| GB | 2200397 | A | * | 8/1988 | E05B 17/0058 |
| KR | 20100038265 | A | * | 4/2010 | E05C 19/08 |
| KR | 20140010738 | A | * | 1/2014 | E05C 19/02 |
| PT | 909361 | E | * | 11/2000 | E05B 63/18 |
| TW | 1375504 | B | * | 10/2012 | F16M 11/10 |
| WO | WO-9730256 | A1 | * | 8/1997 | E05B 13/002 |
| WO | 2017009277 | A1 | | 1/2017 | |
| WO | WO-2023083451 | A1 | * | 5/2023 | E05B 65/006 |

* cited by examiner

LOCK

CROSS-REFERENCE TO RELATED APPLICATION

This application claims the benefit and priority of German Patent Application No. 102024100958.6 filed on Jan. 12, 2024. The entire disclosure of the above application is incorporated herein by reference.

FIELD OF THE INVENTION

The invention relates to a lock comprising a locking mechanism that has a latch that can be moved between a locking position, which is provided for securing a counter-piece movable relative to the locking mechanism, and an unlocking position that is provided for releasing the counter-piece.

SUMMARY OF THE INVENTION

Such locks are generally known and are used, for example, to secure an energy store at an electric bicycle or another electric vehicle or to lock a transport box or a frame lock of the electric vehicle. The latch of the lock is usually pushed by a comparatively strong spring element into the locking position from which said latch can be moved into an unlocking position by means of an actuation element. In this respect, the risk exists that strong vibrations, e.g. when driving over uneven terrain or jumping, could cause an unintentional movement of the latch against the spring force of the spring element into the unlocking position, whereby an energy store secured by the lock can be lost, for example. Furthermore, there is similarly a risk of unauthorized access to the lock in that a strong acceleration can be generated by an application of an increased force to the actuation element and a movement of the latch into the unlocking position can thus be forced.

SUMMARY OF THE INVENTION

It is the underlying object of the invention to provide a lock of the initially named kind that is characterized by an increased level of safety and a high operating comfort.

The object is satisfied by a lock having the features of claim 1. Thus, in addition to the locking mechanism, the lock according to the invention has an actuation element for manually moving the latch into the unlocking position and a coupling pin which is movably supported, in particular displaceably supported, at the latch and with which the actuation element can be selectively brought into engagement. In the engaged state, the actuation element can in particular cooperate directly with the coupling pin, i.e. without interposing further components.

The movable counter-piece of the lock can, for example, be an energy store or a component of an energy store, or a bolt of a frame lock or of a brake disk lock, or a closing hoop or a catch of a lock of a transport box of a respective vehicle or an electric vehicle, particular an electric bicycle. The lock can also be used at another vehicle or electric vehicle, in particular an electric wheelchair, an electric scooter or an electric kart, as well as at a muscle-powered vehicle. The lock according to the invention can also be provided for locking doors or windows, for example of a caravan or a mobile home, as well as for locking cupboard doors or drawers or transport crates or containers. Any desired mechanical lock can generally be replaced by the lock according to the invention.

The latch can, in its locking position, engage into or engage behind a recess of the counter-piece to prevent a removal of the counter-piece from the locking mechanism. Conversely, the latch itself can have a recess into which a corresponding structure of the counter-piece or of the energy store can engage in the locking position. If the lock is intended to secure an energy store, the latch can, in its locking position, engage into a recess of the energy store or can engage behind a projection of the energy store such that the removal of the energy store is blocked.

The actuation element can have a handle for keyless actuation, whereby a higher operating comfort is achieved. The handle can comprise a push-button, a slider or a pulling element for transmitting a linear, in particular pushing or pulling, actuation movement to the coupling element. The handle can comprise a rotary knob or rotary handle, which can be operated by a rotary actuation movement, or a lever. The movement of the latch by the actuation element can in particular take place simply by a manual actuation by a user without an electromotive movement of the latch being provided. The actuation element can generally comprise a lock cylinder and an associated key.

Advantageous embodiments of the invention are set forth in the dependent claims, in the description and in the drawing.

According to one embodiment, the direction of movement of the actuation element is oriented at least substantially perpendicular to a direction of movement of the latch. Furthermore, the actuation of the actuation element can take place against the return force of a return spring.

According to a further embodiment, the direction of movement of the coupling pin is oriented at least substantially perpendicular to a direction of movement of the latch and/or at least substantially perpendicular to a direction of movement of the actuation element.

According to yet a further embodiment, the latch has at least one recess for receiving the coupling pin. The coupling pin can be movably supported in the at least one recess and can in particular be displaceably supported in the direction of a longitudinal axis of the coupling pin such that it is brought out of the effective range of the actuation element. Furthermore, the coupling pin can be rotatably supported in the at least one recess such that the coupling pin takes along the latch into the unlocking position when it is displaced by the actuation element.

According to yet a further embodiment, the actuation element, in particular a slanted control surface of the actuation element, and the coupling pin form a ramp mechanism for converting a movement of the actuation element into a movement of the latch.

According to yet a further embodiment, a control element is provided for moving the coupling pin, in particular for selectively activating or deactivating the ramp mechanism. In particular, when the ramp mechanism is activated and when the actuation element is actuated, the slanted control surface of the actuation element can run onto the coupling pin and can thereby move the latch into the unlocking position and, when the ramp mechanism is deactivated and the actuation element is actuated, said slanted control surface can run empty without moving the latch into the unlocking position.

Furthermore, the lock can comprise at least one actuator, in particular an electromechanical or electromagnetic actuator, for actuating the control element. The control element can be rotationally and/or translationally moved by the actuator, in particular rotated, pivoted or displaced, in order to thereby effect a movement of the coupling pin.

The latch can be movable from the locking position into the unlocking position against a return force of a spring. It is thus ensured that the latch is generally urged into its locking position. The risk of accidentally releasing the counter-piece from the locking mechanism is hereby reduced. Furthermore, a latching function that enables an automatic latching of the counter-piece, for example an energy store, in the locking mechanism can be realized by the spring, wherein, after the latching in, the latch is automatically moved into the locking position by the spring.

The coupling pin can also be movable against the return force of a spring, in particular from a position in which it can be brought into engagement with the actuation element into a position in which it cannot be brought into engagement with the actuation element, or vice versa.

According to a further embodiment, the lock has a blocking element that is adjustable between a blocking position, in which the latch is blocked in its locking position, and a release position in which the latch is movable into its unlocking position. The blocking element can, for example, be configured as a pin. The blocking element can generally cooperate with any desired movable element of the lock to block the latch, but preferably with the latch itself.

In the blocking position, the locking mechanism therefore directly secures the counter-piece in the lock by means of the latch and the blocking element furthermore blocks the locking mechanism so that an actuation of the latter is only possible after the adjustment of the blocking element into the release position. A total of two release steps are therefore required to unlock the lock. An accidental movement of the latch into the unlocking position, for example when driving over uneven terrain or due to a violent action on the lock, is particularly effectively prevented by the blocking element in the blocking position so that the security of the lock is increased.

An adjustment of the blocking element between the blocking position and the release position can comprise a rotational movement and/or a translational movement of the blocking element. For example, the adjustment of the blocking element can comprise a pivoting, a rotation or a displacement of the blocking element, or a combination thereof, in particular a linear movement along a longitudinal axis of the blocking element.

According to one embodiment, the blocking element is formed at the control element. Alternatively or additionally, the blocking element can be formed by the coupling pin itself.

According to one embodiment, the blocking element, in its blocking position, is in engagement with a component of the lock, in particular with a non-movable component, such as a housing, of the lock. The component of the lock can be configured to prevent a movement of the blocking element along the direction of movement of the latch. A movable component of the lock can generally be provided to secure the blocking element in its blocking position. At the movable or non-movable component of the lock, in particular at the housing of the lock, a corresponding receiver for the blocking element can be provided that blocks a movement of the blocking element, in particular in the direction of movement of the latch.

According to one embodiment, the lock has at least one actuator for adjusting the blocking element between its blocking position and its release position. The actuator can be an electromechanical or electromagnetic actuator. This is in particular the actuator provided for actuating the control element. A manual transfer of the blocking element into a blocking position or release position by a user of the lock is thus unnecessary, whereby the operating comfort is increased. Since only the blocking element is actuated by the actuator, but not the latch, an actuator with lower power and/or more compact dimensions can be used.

Provision can be made that the lock has a receiving unit for receiving a release signal transmitted in a wired or wireless manner, in particular by a cell phone, wherein the release signal can include the instruction to adjust the blocking element into the release position or blocking position. A keyless actuation of the lock can comprise that, after an electrical adjustment of the blocking element into the release position, a manual movement of the latch into the unlocking position by means of the actuation element can take place.

To alert the user to a faulty, in particular incomplete, locking of the lock, the lock can further comprise a detection device for detecting the adoption of the locking position by the latch. It can be monitored by the detection device whether the latch actually reaches its locking position during a locking process or whether it is, for example, prevented from doing so by an incorrectly inserted energy store. In the latter case, a suitable warning can be issued to the user, for example in the form of visual and/or acoustic feedback generated at an on-board computer of an electric bicycle, at a cell phone of the user and/or at the lock itself.

The detection device can, for example, comprise an actuator, in particular an electromechanical or electromagnetic actuator, for adjusting a blocking element that is adjustable between a blocking position, in which the latch is blocked in its locking position, and a release position in which the latch is movable into its unlocking position. The actuator can in particular be the same actuator that is also provided for moving the control element.

DRAWINGS

The invention will be described in the following purely by way of example with reference to possible embodiments and to the enclosed drawing. There are shown:

DETAILED DESCRIPTION OF THE INVENTION

Figure 1A:
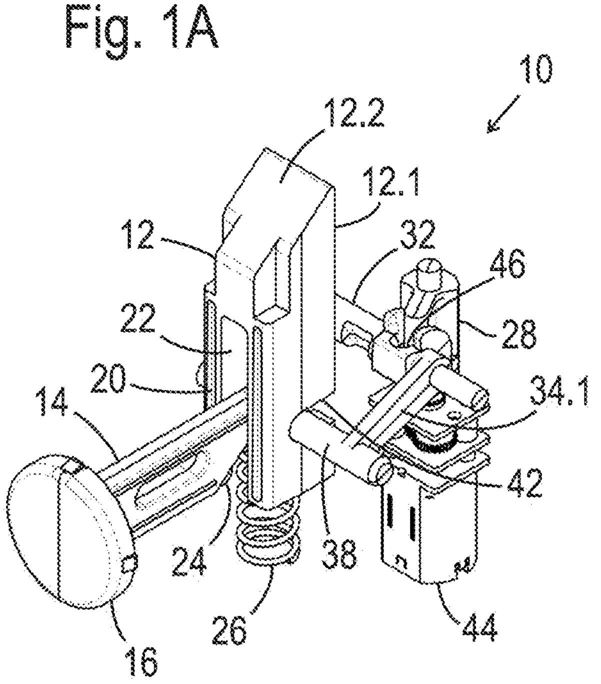
FIG. 1A is a perspective view of a first embodiment of a lock according to the invention with a deactivated ramp mechanism.

A first embodiment of a lock 10, in particular for an electric bicycle and, for example, for securing an energy store at the electric bicycle, is shown in FIGS. 1A to 3B. However, the lock 10 can generally also be used to lock doors, windows, drawers, transport boxes, containers or generally as a replacement for a mechanical lock. The lock 10 comprises a locking mechanism comprising a latch 12 that has a locking section 12.1. The latch 12 can be moved between a locking position shown in FIGS. 1A and 1B and an unlocking position shown in FIGS. 3A and 3B. In the locking position, the locking section 12.1 of the latch 12 can be brought into engagement with a counter-piece movable relative to the locking mechanism, for example the energy store (not shown), in order to secure said counter-piece, wherein the unlocking position is provided to release the counter-piece.

The latch 12 is supported by means of a spring 26 so that it can be brought from its locking position into the unlocking position against the return force of the spring 26. A latch function of the lock 10 can be realized by supporting the latch 12 by means of the spring 26. The insertion of a counter-piece, for example the energy store, into the lock 10 can take place with the latch 12 in the locked state since, during the insertion of the counter-piece, the latch 12 is pressed against the return force of the spring 26 into its unlocking position in the meantime. A control slope 12.2 is provided at the latch for this purpose. Once the counter-piece is fully inserted into the lock 10, the latch 12 is automatically urged into its locking position by the spring 26 so that the counter-piece is immediately protected against loss.

To move the latch from the locking position into the unlocking position, the lock 10 comprises a manually actuable actuation element 14 that, in the embodiment shown, comprises a handle 16 in the form of a push-button. When the push-button is actuated, the actuation element 14 is moved along an actuation axis and against the return force of a return spring, not shown, in the direction of the latch 12.

The actuation element 14 is guided in a guide section 20 of the latch 12. In the present embodiment example, the guide section 20 forms a guide chute 22 that is disposed centrally within the latch 12 and that is bounded by the guide section 20 in particular at three sides, namely at the side and at the top in the Figures. Alternatively, a guide for the actuation element 14 that is arranged in a decentralized manner in or at the latch 12, e.g. at an outer side of the latch 12, is also conceivable, however. For example, the guide section 20 can define a laterally open guide for the actuation element 14, said guide in particular being bounded by the guide section 20 only at one side as well as at the top and possibly at the bottom.

The longitudinal axis of the latch 12, and thus its direction of movement, is oriented perpendicular to the direction of movement of the actuation element 14 along the actuation axis.

To convert the actuation movement of the actuation element 14 into the latch movement perpendicular thereto, a ramp mechanism is provided that is formed, on the one hand, by a slanted control surface 24 of the actuation element 14 and, on the other hand, by a coupling pin 38 of a control element 28. The ramp mechanism can be selectively activated or deactivated by the control element 28. If the ramp mechanism is activated, the slanted control surface 24 can run onto the coupling pin 38 on an actuation of the actuation element 14 and can thus push the latch 12 into the unlocking position. If, on the other hand, the ramp mechanism is deactivated, the coupling pin 38 is displaced such that the slanted control surface 24 passes through an interruption 40 of the coupling pin 38 on an actuation of the actuation element 14 and the movement of the actuation element 14 so-to-say runs into nothing without moving the latch 12.

Figure 1B:
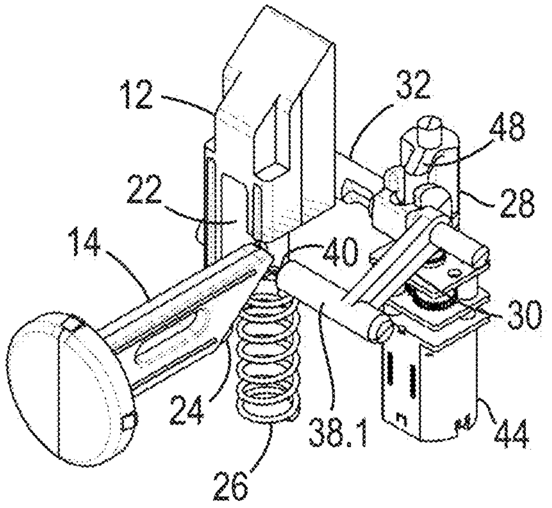
FIG. 1B illustrates the lock of FIG. 1A with a partly broken-open latch.

According to FIGS. 1A and 1B, the coupling pin 38 is in a decoupling state in which its interruption 40 is aligned with the actuation element 14 so that a movement of the actuation element 14 has no effect on the latch 12. To be able to move the latch 12 into its unlocking position by means of the actuation element 14, the coupling pin 38 can be displaced into a coupling state by the control element 28 (FIGS. 2A and 2B) so that the slanted control surface 24 runs onto the coupling pin 38 on an actuation of the actuation element 14 and thus presses the latch 12 into the unlocking position (FIGS. 3A and 3B).

In the embodiment example shown, the control element 28 is configured as a control fork 30 that, in addition to a suspension strut 32, comprises a first prong 34.1 and a second prong 34.2 and thus engages around the latch 12 at three sides.

The coupling pin 38 extends between the first and second prongs 34.1, 34.2 so that its longitudinal axis is oriented perpendicular to the prongs 34.1, 34.2 and to the direction of movement of the latch 12. The coupling pin 38 is arranged at an end of the control fork 30 disposed opposite the suspension strut 32 and substantially centrally impacts the latch 12 with respect to the actuation axis of the actuation element 14.

To be able to receive the coupling pin 38, the latch 12 has two passage openings 42 that are arranged at oppositely disposed sides of the latch 12 with respect to the longitudinal axis of the coupling pin 38.

The coupling pin 38 is formed in two parts and comprises a first coupling pin section 38.1 and a second coupling pin section 38.2 that are separated by the interruption 40. The width of the interruption 40 is adapted to the width of the actuation element 14 such that the actuation element 14 can dip into the interruption 40 without coming into engagement with the coupling pin 38. This characterizes precisely the decoupling state according to FIGS. 1A and 1B.

To transfer the coupling pin 38, starting from the decoupling state shown in FIGS. 1A and 1B, into the coupling state—and possibly vice versa—, the lock 10 has an electric motor 44 that is connected to the control element 28 via the suspension strut 32. The suspension strut 32 has a pivot groove 46 that, in the embodiment example shown, is connected in a hinged manner to a pivot arm 48 seated on a chute of the electric motor 44, wherein the pivot arm 48 can be pivoted into well-defined positions. A first position of the pivot arm 48 shown in FIGS. 1A and 1B corresponds to the decoupling state and a second position of the pivot arm 48 shown in FIGS. 2A and 2B corresponds to the coupling state of the coupling pin 38.

Figure 2A:
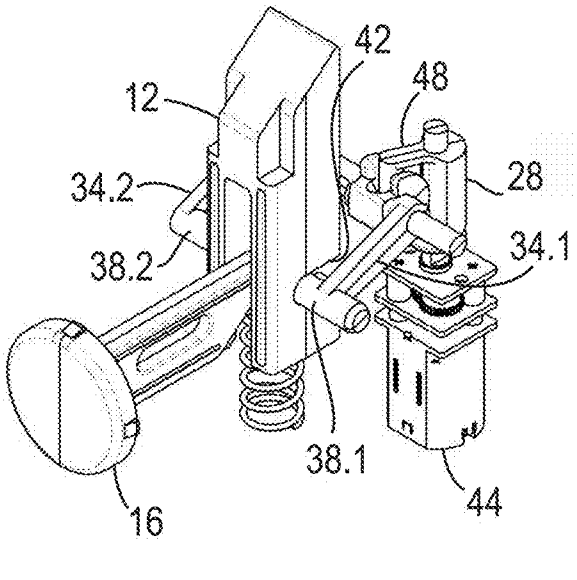
FIG. 2A is a perspective view of the lock of FIG. 1A with an activated ramp mechanism.
Figure 2B:
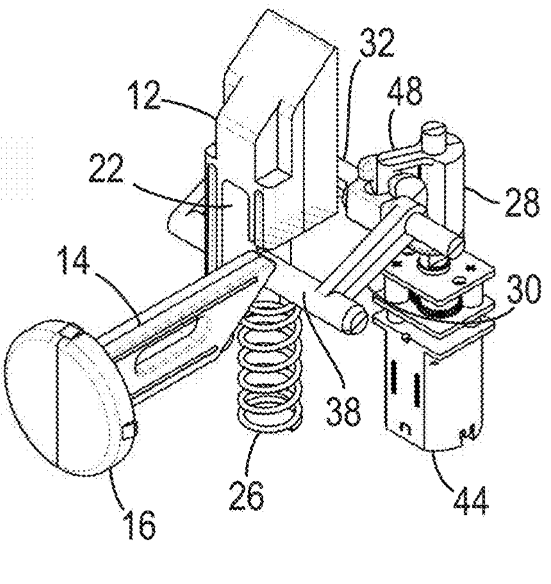
FIG. 2B shows the view of FIG. 2A with a partly broken-open latch.
Figure 3A:
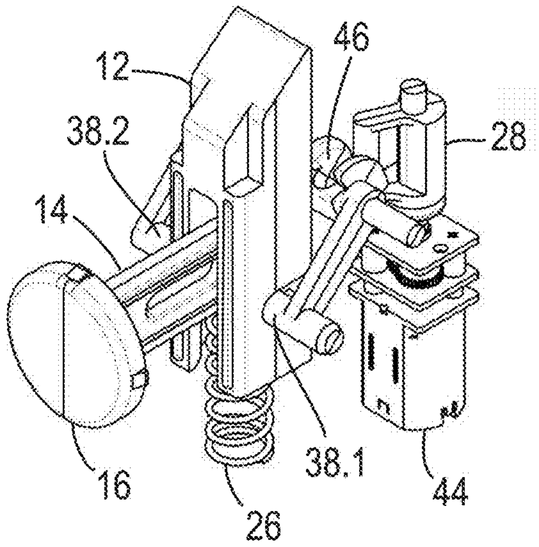
FIG. 3A is a perspective view of the lock of FIG. 1A with an activated ramp mechanism and an actuated actuation element.
Figure 3B:
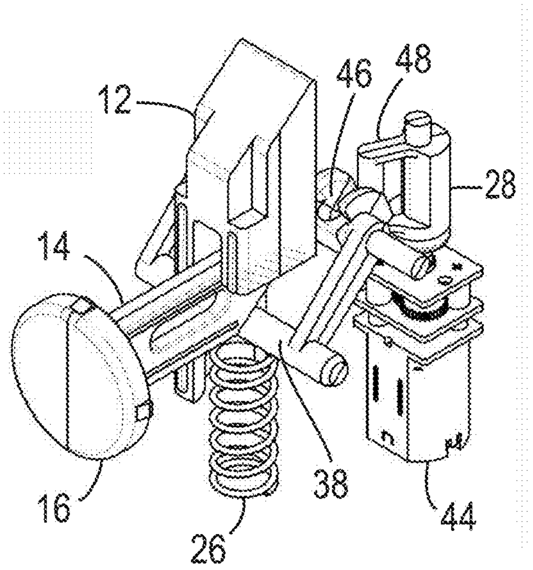
FIG. 3B shows the view of FIG. 3A with a partly broken-open latch.

A pivoting of the pivot arm 48 from the first position according to FIGS. 1A and 1B into the second position according to FIGS. 2A and 2B leads to a linear displacement of the control element 28 along the longitudinal axis of the coupling pin 38. The interruption 40 of the coupling pin 38 is displaced relative to the actuation element 14 by the linear displacement so that the slanted control surface 24 of the actuation element 14 can run onto the coupling pin 38. The coupling pin 38 is thus brought into its coupling state (FIG. 15).

The latch 12 is movably connected to the control element 28 via the coupling pin 38. In particular, a relative rotation of the control element 28 about the longitudinal axis of the coupling pin 38 and a relative translation in the direction of the longitudinal axis of the coupling pin 38 are possible.

Figure 4A:
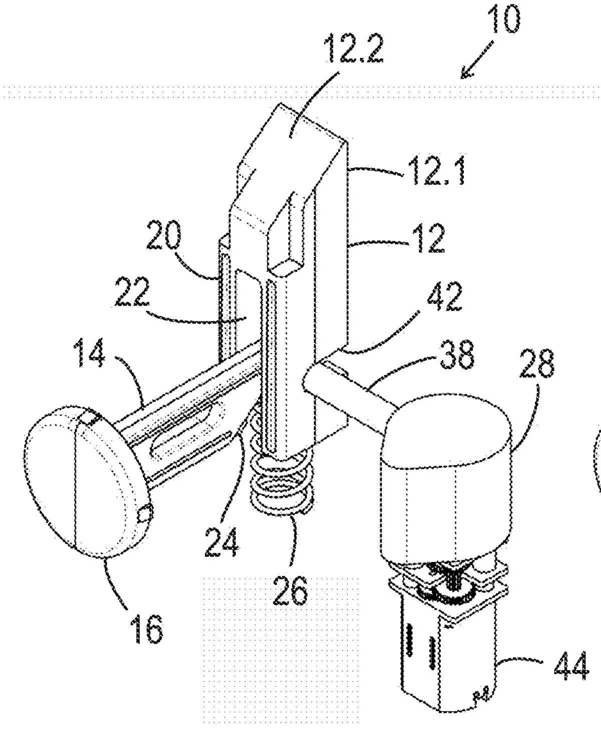
FIG. 4A is a perspective view of a second embodiment of a lock according to the invention with a deactivated ramp mechanism.
Figure 4B:
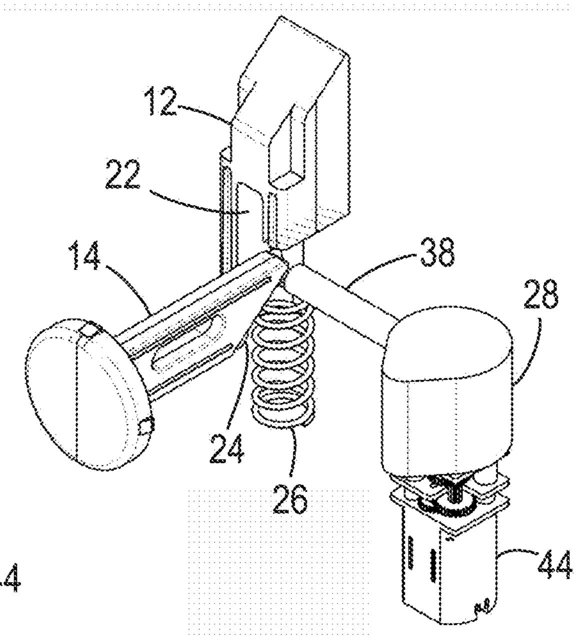
FIG. 4B illustrates the lock of FIG. 4A with a partly broken-open latch.
Figure 5A:
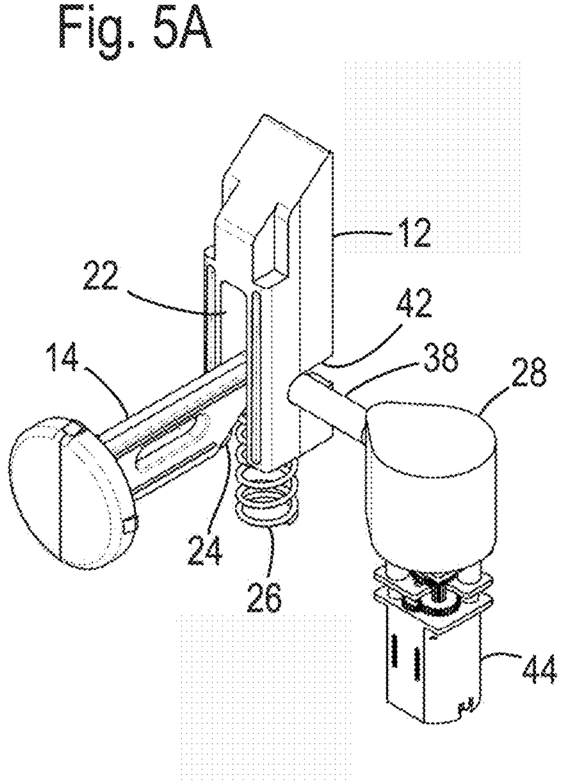
FIG. 5A is a perspective view of the lock of FIG. 4A with an activated ramp mechanism.
Figure 5B:
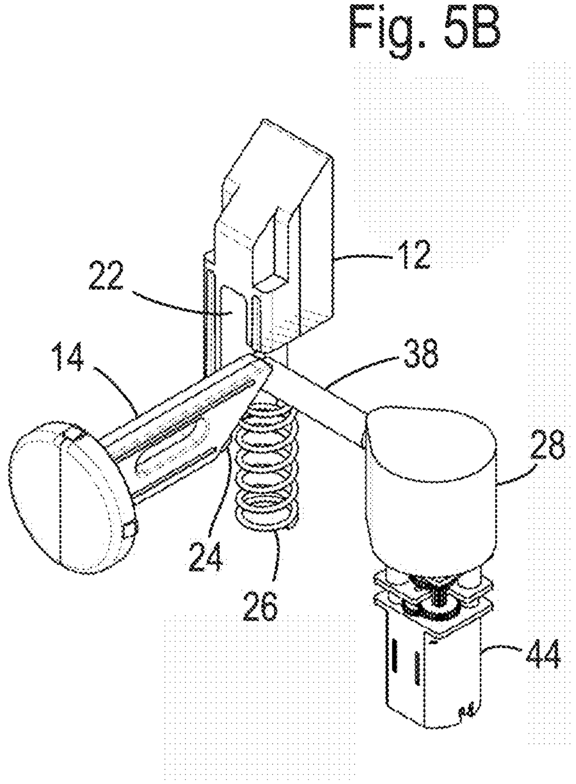
FIG. 5B shows the view of FIG. 5A with a partly broken-open latch.

A second embodiment of a lock 10 is shown in FIGS. 4A to 6B that differs from the above-described first embodiment only in that the coupling pin 38 here is a continuous pin that, in order to deactivate the ramp mechanism, can be moved out of the latch 12 or, more precisely, out of the guide of the latch 12 for the actuation element 14, here from the guide chute 22, to such an extent that the actuation element 14 can, in the case of its actuation, move past the coupling pin 38 without the slanted control surface of the actuation element 14 running onto the coupling pin 38 and thereby moving the latch 12 into its unlocking position (FIGS. 4A and 4B).

Figure 6A:
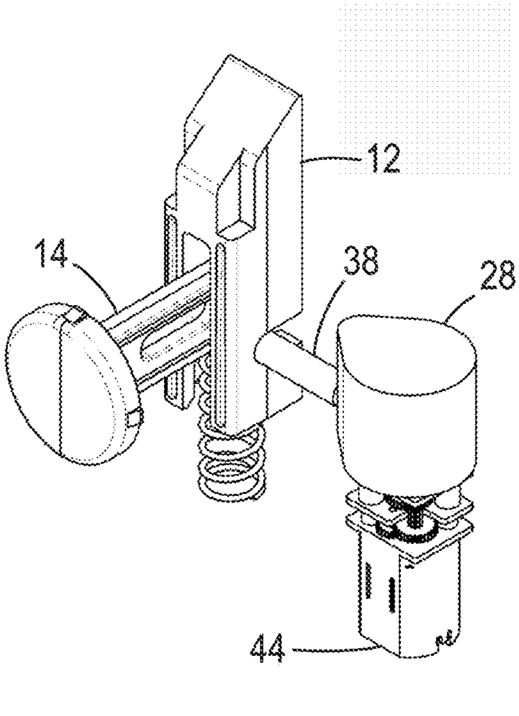
FIG. 6A is a perspective view of the lock of FIG. 4A with an activated ramp mechanism and an actuated actuation element.
Figure 6B:
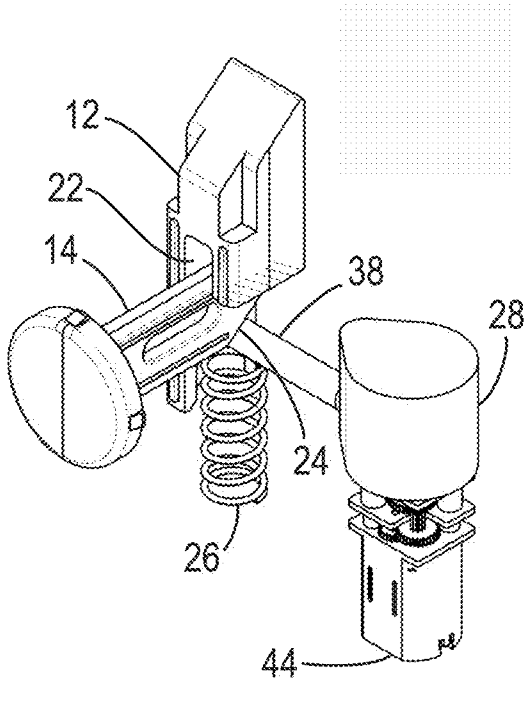
FIG. 6B shows the view of FIG. 6A with a partly broken-open latch.

The displacement of the coupling pin 38 out of the guide chute 22 in this respect takes place by the return force of a spring, not shown, that presses the coupling pin 38 against a control element 28 that is cam-like in this embodiment. The cam-like control element 28 can be rotated by an electric motor 44 so that the coupling pin 38 is pushed back into the guide chute 22 of the latch 12 (FIGS. 5A and 5B) against the return force of the spring, not shown, so that the slanted control surface 24 of the actuation element 14 can now run onto the coupling pin 38 on an actuation of the actuation element 14 and can thereby move the latch 12 into its unlocking position (FIGS. 6A and 6B).

In the second embodiment shown in FIGS. 4A to 6B, the coupling pin 38 has a round cross-section, in particular a circular cross-section. It is understood that the coupling pin 38 can, however, generally also have a non-round cross-section. A coupling pin 38 having a planar control surface is in particular conceivable, wherein the position or inclination of this planar control surface is in particular adapted to the slanted control surface 24 of the actuation element 14 so that the actuation element 14 comes into contact with the coupling pin 38 on a maximum surface. For example, the cross-section of the coupling pin 38 could be semi-circular or quadrangular, in particular square, for this purpose.

What is claimed is:

1. A lock comprising:

a locking mechanism that has a latch that can be moved between a locking position, which is provided for securing a counter-piece movable relative to the locking mechanism, and an unlocking position provided for releasing the counter-piece;

an actuation element for manually moving the latch into the unlocking position; and a coupling pin which is movably supported at the latch and with which the actuation element can be selectively brought into engagement, wherein the coupling pin moves along a lateral direction of movement that is transverse to a longitudinal direction of movement of the actuation element;

wherein the actuation element has a slanted control surface configured to be brought into engagement of the coupling pin, thereby forming a ramp mechanism with the coupling pin for converting a movement of the actuation element in the longitudinal direction of movement into a movement of the latch that is transverse to the longitudinal direction of movement and transverse to the lateral direction of movement of the coupling pin.

2. The lock according to claim 1, wherein the longitudinal direction of movement of the actuation element is oriented at least substantially perpendicular to the direction of movement of the latch.

3. The lock according to claim 1, wherein the lateral direction of movement of the coupling pin is oriented at least substantially perpendicular to the direction of movement of the latch and at least substantially perpendicular to the longitudinal direction of movement of the actuation element.

4. The lock according to claim 1, wherein the latch has at least one recess for receiving the coupling pin.

5. The lock according to claim 1, further comprising a control element for moving the coupling pin.

6. The lock according to claim 5, wherein the control element for moving the coupling pin is for selectively activating or deactivating the ramp mechanism comprising the actuation element and the coupling pin.

7. The lock according to claim 5, further comprising at least one actuator for actuating the control element.

8. The lock according to claim 1, wherein the latch can be brought from the locking position into the unlocking position against a return force of a spring.

9. The lock according to claim 1, wherein the coupling pin is adjustable between a blocking position, in which the latch is prevented from being actuated from its locking position, and a release position in which actuation of the latch is permitted and the latch is movable into its unlocking position.

10. The lock according to claim 1, further comprising a detection device for detecting the adoption of the locking position by the latch.

11. The lock according to claim 10, wherein the detection device comprises an actuator for adjusting the coupling pin that is adjustable between a blocking position, in which the latch is prevented from being actuated out of its locking position, and a release position in which the latch is movable into its unlocking position.

* * * * *